United States Patent [19]

Asnis et al.

[11] 3,909,253
[45] Sept. 30, 1975

[54] WELDING WIRE

[76] Inventors: Avraam Efimovich Asnis, Bulvar Lesi Ukrainki, 2, kv. 5; Jury Yakovlevich Gretsky, ulitsa Semashko, 21, kv. 116; Evgeny Petrovich Kuznetsov, Anri Barbjusa, 22/26, kv. 86; Nikolai Alexandrovich Slavinsky, ulitsa Aviatsii, 41, kv. 24; Igor Mikhailovich Melnichenko, ulitsa Krasnoarmeiskaya, 136, kv. 5, all of Kiev, U.S.S.R.

[22] Filed: July 19, 1974

[21] Appl. No.: 489,887

[30] Foreign Application Priority Data
July 19, 1973 U.S.S.R. ............................... 1946984

[52] U.S. Cl. .................................... 75/170; 29/193
[51] Int. Cl.² .......................................... C22C 19/03
[58] Field of Search ....... 75/170, 171; 148/32, 32.5; 29/193, 193.5

[56] References Cited
UNITED STATES PATENTS
2,872,309   2/1959   Bolkcom et al..................... 75/170

*Primary Examiner*—R. Dean
*Attorney, Agent, or Firm*—Holman & Stern

[57] ABSTRACT

Welding wire for welding cast iron based on nickel and containing in the following weight percent:

| | |
|---|---|
| manganese | 0.5 – 10 |
| copper | 0.2 – 5.0 |
| iron | 0.05 – 15.0 | and at least one metal in the amount of 0.1–0.5 weight percent selected from the group of rare-earth metals.

The present wire can be efficiently used for welding grey, malleable, and high-grade spheroidal-graphite cast iron and their combinations with carbon and alloy steels in manufacture and repair of parts and in remedying casting defects.

4 Claims, No Drawings

WELDING WIRE

The present invention relates to welding materials and more particularly to welding wires for welding cast iron.

The invention is preferable for use in welding grey iron, malleable iron, and high-grade spheroidal-graphite cast iron and their combinations with carbon and alloy steels in manufacturing and repairing of parts and in remedying casting defects.

Nickel based electrode materials are used generally to produce quality joints in cold welding of cast iron. High strength, tightness and good workability of cast iron joints are achieved due to some of the specific features of nickel and its alloys in contrast to the use of iron or copper-based electrode materials. A typical example is the widely popular high-nickel electrodes manufactured by the Castolin (Switzerland) and NTP (Austria) producers for manual arc welding.

The use of wire for welding cast iron gives a number of important advantages when compared with welding by stick electrodes. First with the use of wire, the welding process can be mechanized. Second, it becomes possible to weld at low power ratings (80 – 100 A, 14 – 18 V). Third, it becomes possible to weld in narrow grooving in the form of a slot because a small wire diameter (0.8 – 1.2 mm) reduces the amount of metal deposit, decreases heating of the weld zone, facilitates producing cast iron joints without cracks, reduces the consumption of electrode material, and substantially improves welding productivity.

Additionally, the use of small-diameter wire (0.8–1.2 mm) and consequently application of small-size holders with light-weight flexible hoses for feeding wire makes semiautomatic welding easier especially in the hard-to-reach places of intricately shaped parts, which is frequently of importance in repair activities.

Fourth and last, stable quality of welding wire is easier to achieve in manufacturing than that of coated stick electrodes.

Commonly known are high-nickel wires containing besides the base element, the following (in weight percent): Mn - 2.3 – 5.4; Cu - up to 0.5; Fe - up to 0.65 and Si, C, S and P as additions.

However, with respect to welding cast iron these wires suffer from substantial disadvantages. It is known that the chemical composition of cast irons is characterized by large amounts of carbon, silicon, sulphur and phosphorus. These elements inevitably diffuse into the weld joint. They are especially dangerous in nickel alloys because of their likelihood to form crystallization cracks. In welding cast iron with wires of said compositions, the harmful effect of additions in joints is not neutralized; deposited metal is of a closegrained austenitic structure with a high concentration of additions over the bounderies of grains where crystallization cracks are formed.

Cast iron welding methods with known wires affords no tightness of the joint other than by providing shielding such as flux or inert gas, for example, argon. This however is frequently inconvenient, especially in repairing thin-walled parts of intricate shaping.

The principal object of the present invention is to provide welding wire for welding cast iron which would make it possible to produce strong and dense weld joints.

Another object of the invention is to provide welding wire for welding cast iron, which would make it possible to perform welding by open arc with no additional gas or flux shielding.

One more object of the invention is to provide welding wire for welding cast iron, which would make it possible to produce easily workable weld joints.

These and other objects are achieved by provision of welding wire for welding cast iron, which is nickel-based and contains manganese, copper, and iron, and which according to the invention besides nickel and said components taken in the following proportion in weight percent:

| manganese | 0.5 –10 |
| copper | 0.2 – 5 |
| iron | 0.05–15 | also contains rare-earth metals taken individually or in a combination in the amount of 0.1 – 0.5 weight percent.

It is commonly known that molten nickel can dissolve a considerable amount of carbon which is separated during crystallization mostly as graphite. Nickel is also condusive to graphitization of Ni-Fe-C alloys. On the other hand, iron and nickel form a continuous line of solid solutions, i.e. they possess unlimited solubility, to allow a uniform structure of joints in cast iron to be obtained. Ni-Fe-C alloys are characterized by austenitic structure, high plasticity, and low yield point.

The above mentioned properties of nickel explain why it is taken as a base in developing welding wire for welding cast iron.

However, in welding cast iron, nickel welds suffer from a disadvantage consisting in that they are liable to form crystallization cracks because sulphur and other harmful inclusions, which are always present in large amounts in cast iron, inevitably transfer to the welding bath from the basic metal. The presence of sulphur even in terms of 0.01 percent makes nickel brittle due to a thin layer of nickel sulphide, $Ni_3S_2$, positioned over the boundaries of the grains.

Manganese, being of closer affinity to sulphur than nickel reduces its harmful effect. Manganese sulphide is formed in the presence of manganese instead of nickel sulphide, separated as compact inclusions. Apart from that, manganese also acts as a deoxidant of the welding bath because it is in closer affinity to oxygen than nickel and iron.

We have determined that with the content of manganese in welding wire less than 0.5 weight percent its desulphurating effect is so weakened that welds become liable to produce crystallization cracks. The top limit of the manganese content in wire is defined as 10 weight percent; with a higher content of manganese, formation of ledeburite is revealed in the fusing zone and the workability is lowered.

Addition of copper to the wire helps formation of nonmetal inclusions, such as spherical graphite, thus improving the durability of joints against crystallization cracks.

Besides, presence of copper reduces the melting point of wire, improves wettability of the fused surface of the basic metal, and betters the formation of welds, thus preventing "cuts."

However, excessive content of copper impairs the technological properties of wire and complicates the welding process. The melting point of wire drops so much that wire overheats excessively, losses its resilience and welds to the holder tip. This determines the top extreme of the copper content to be equal to 5 weight percent.

With the content of copper less than 0.2 weight percent the effect of globularization of graphite inclusions is not observed.

The wire contains iron. It can be included as an addition and in this case its contents is close to the lower extreme (0.05 – 0.8 weight percent) according to the invention. However, larger amounts of iron in the wire up to 15 weight percent may be favourable from the metallurgical point of view.

With an increasing content of iron the high-nickel metal of the weld makes it stronger, its shrinkage reduces and its durability against crystallization cracks improves.

Requirements are frequently set up for a slight difference in the colour of deposited metal and welded cast iron. In this case, alloying the weld by iron is essential.

Cast irons continuously worked under the conditions of high-temperature corrosion and aggressive media, especially with frequent temperature changes, are very reluctant to welding due to poor wetting of the basic metal by the welding bath. Addition of iron in this case improves wetting and formation of the weld.

Higher content of iron also improves wetting of the depositied metal by the welding bath during multi-layer welding.

It is known and proved by our research that with a higher than 45 percent content of iron in high-nickel welds in cast iron there is a risk of cold cracks occurring in the weld and the weld zone. Therefore, the content of iron in the wire is limited by 15 weight percent proceeding from the premise that the metal of the weld in the first layer of depositing to cast iron would not contain more than 45 percent of iron, taking into account that a proportion of elements from the basic metal can reach about one third.

In developing the wire, important properties of rare-earth metals were utilized: high activity in relation to sulphur and oxygen and also low boiling and evaporating points.

The refining and deoxidizing function of rare-earth metals improves the durability of welds against crystallization cracks and by thus enhances the effect of manganese.

The ability of rare-earth metal to evaporate intensively at welding temperatures and their high activity were utilized to provide the protection of liquid metal against air and to permit welding by open arc without additional shielding with the help of inert gas or flux.

In the course of welding, a mixture of vapours of the alloy components is found at the surface of the liquid metal.

The vapour pressure of rare-earth metals is particularly increasing with a temperature raising up to 2,200° – 2,400°C, i.e., to that of droplets of the electrode metal. Thus, the protective action of rare-earth metals is manifested in the course of formation of droplets and their transfer to the welding bath when the liquid metal is most susceptible to the harmful air effects.

The protective effect of rare-earth metal starts manifesting itself with their content in the wire singly or in a combination in the amount of 0.1 weight percent.

The top extreme of the rare-earth metal content - 0.5 weight percent is determined by adaptability of nickel alloys to manufacture the wire.

The wire is produced from alloys molten in vacuum furnaces, by way of further rolling or extrusion and drawing to obtain the required diameter. With the content of rare-earth metals higher than 0.5 weight percent the alloys suffer from hot-shortness as well as from granulation due to the formation of a eutectic which prevents drawing of wire to reduce it to small diameters (1 – 1.6 mm).

According to the invention, the wire may contain one or several rare-earth metals, whereas in the first and second cases the required quality of the wire is well achieved because all rare-earth metals are very close to each other in properties and under welding conditions they function equally as readily evaporating and highly active components.

It is expedient to use cerium as an element being most wide-spread from rare-earth ones and broadly employed in industry. In this case cerium is present singly in the wire if it is introduced into the meld as pure metal or in compounds or combinations with lanthanum and other rare-earth metals if it is introduced in the form of cerium rich alloys such as ferrocerium, misch-metal. Proportions of rare-earth metals specific for alloys is also retained in the wire. For example, with the use of ferrocerium of misch-metal, the proportioning in the content of cerium, lanthanum and the total amount of other rare-earth metals in the wire remains approximately 2:1:1.

From all rare-earth metals, cerium and lanthanum are most active, therefore in case these metals are present in the wire singly, their content in the top extreme may be limited by 0.4 weight percent.

Rare-earth elements and manganese serve as desulphuring and deoxidizing agents. Therefore, with the manganese content increased to 9 – 10 percent it is possible to reduce the content of rare-earth elements down to the lower extreme, which is favourable for wire manufacture. In this case it is also desirable to reduce the content of iron with a view of retaining the high proportion of nickel. On the contrary, with the manganese content reduced, it is desirable to keep the content of rare-earth metals at the top extreme. At the same time, the content of iron can be increased up to 12 – 15 weight percent which is necessary for performing multi-layer welding.

Comprehensive testing of the proposed welding wire under laboratory and production conditions has revealed that in welding grey, malleable, and high-grade cast iron without additional shielding, it is possible to achieve strong and tight joints suitable for operation under pressure.

The weld metal represents a high-nickel austenitic alloy with a hardness of 160 – 180 HV, it is dense and highly durable against crystallization cracks. Cementite and ledeburite are practically not present in the fusing zone in welding conventional grey iron and malleable iron.

The heat-affected zone contains a narrow strip with martensite which improves hardness up to 300 HV, but does not impair machining by any kind of cutting tool (in planing, milling, drilling, etc).

The weld metal features high mechanical properties: tensile strength — up to 55 kg/mm$^2$, yield point — up to 35 kg/mm$^2$, elongation — up to 20 percent.

The strength of joints on the whole is determined by the quality and properties of cast iron being welded. In tensile tests of weld joints it was the basic metal that failed.

The present invention will be more readily understood from the actual examples of its realization given in the description and tabulated below.

The table presents typical compositions of wires according to the invention. These wires have been thoroughly tested both under the laboratory and actual production conditions.

Table

| Type of wire composition | Content of elements in weight percent | | | | | | Other rare-earth metals |
|---|---|---|---|---|---|---|---|
| | Ni | Mn | Cu | Fe | Ce | La | |
| 1 | 2 | 3 | 4 | 5 | 6 | 7 | 8 |
| I | Base | 9.15 | 0.50 | 0.58 | 0.15 | 0.06 | 0.05 |
| II | " | 5.37 | 3.07 | 3.52 | 0.21 | 0.12 | 0.09 |
| III | " | 6.39 | 3.18 | 4.34 | 0.16 | — | — |
| IV | " | 3.62 | 1.82 | 4.76 | 0.31 | — | — |
| V | " | 7.24 | 2.53 | 2.67 | — | 0.19 | — |
| VI | " | 8.43 | 4.33 | 0.27 | — | 0.30 | — |
| VII | " | 1.81 | 2.16 | 12.33 | 0.20 | 0.11 | 0.06 |
| VIII | " | 0.90 | 2.73 | 5.64 | 0.26 | 0.12 | 0.11 |

The above described wires and those close to them in chemical composition were tested in welding samples and parts made from conventional grey iron with flake graphite with ferritic-perlitic and perlitic metal base, also from malleable ferritic cast iron with spheroidal graphite, and from their combinations with steel.

Welding was performed with 1 mm and 1.2 mm diameter wire by open arc with direct current of straight polarity. Welding current and voltage were as follows: 90 – 130 A, 15 – 18 V. Welding speed was 12 – 16 cm/min.

It has been determined with the help of wire types I – III, V, VI is possible to weld together parts made from grey and malleable cast irons and also to produce combination parts of cast iron and steel, that is to weld tubes, to weld up cast iron or steel flanges, etc. Wires types I - III, V, VI are also suitable for important repair jobs: welding up cracks and other defects in intricately shaped thin-walled grey iron castings operated under pressure, for example, welding up cracks in cooling jackets and oil passages of cylinder blocks and cylinder heads of internal-combustion engines, welding up cracks in cast iron boilers, compressor units, pumps, valves, etc.

Wires types IV, VII and VIII with lower content of manganese are suitable for welding magnesium spheroidalgraphite cast iron featuring a low content of sulphur due to desulphurization when modified in the course of manufacture.

From the above description and examples it can be seen that the wire assures the production of strong and tight, easily machineable joints in cast iron by open-arc welding without additional shielding. In addition, an important advantage of the proposed wire is high stability arcing and practically complete absence of metal spitting.

What we claim is:

1. A welding wire for welding cast iron, based on nickel and consisting essentially of in the following weight percent:

| manganese | 0.5 – 10 |
| copper | 0.2 – 5.0 |
| iron | 0.05 – 15.0 | and at least one metal in the amount of 0.1 – 0.5 weight percent selected from the group consisting of rare-earth metals with the balance being nickel.

2. Welding wire as set forth in claim 1, which further contains cerium.

3. Welding wire as set forth in claim 1, which further contains lanthanum.

4. Welding wire as set forth in claim 1, which further contains cerium in combination with lanthanum and other rare-earth metals in the approximate proportioning of 2:1:1 respectively.

* * * * *